(12) United States Patent
Dürkop et al.

(10) Patent No.: US 11,001,211 B2
(45) Date of Patent: May 11, 2021

(54) METHOD AND SYSTEM FOR SECURE SIGNAL MANIPULATION FOR TESTING INTEGRATED SAFETY FUNCTIONALITIES

(71) Applicant: Volkswagen Aktiengesellschaft, Wolfsburg (DE)

(72) Inventors: Henning Dürkop, Braunschweig (DE); Marc Neubauer, Vechelde GT Siersse (DE); Alejandro Lorda Cobos, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 16/807,678

(22) Filed: Mar. 3, 2020

(65) Prior Publication Data
US 2020/0290533 A1 Sep. 17, 2020

(30) Foreign Application Priority Data
Mar. 11, 2019 (DE) ...................... 10 2019 203 251.6

(51) Int. Cl.
  *B60R 16/023* (2006.01)
  *B60W 50/04* (2006.01)
  *H04L 12/40* (2006.01)
(52) U.S. Cl.
  CPC ....... *B60R 16/0232* (2013.01); *B60W 50/045* (2013.01); *H04L 12/40* (2013.01); *H04L 2012/40273* (2013.01)
(58) Field of Classification Search
  CPC ............ B60R 16/0232; B60W 50/045; B60W 2050/0005; B60W 2050/0045;
  (Continued)

(56) References Cited

U.S. PATENT DOCUMENTS

| 7,593,791 B2 | 9/2009 | Watzl ................................ 701/1 |
| 9,251,024 B2 | 2/2016 | Kiffmeier et al. |

(Continued)

FOREIGN PATENT DOCUMENTS

| DE | 102006039395 A1 | 3/2008 | ............. B60R 16/02 |
| DE | 102012215343 A1 | 5/2014 | ............. B60W 50/02 |

(Continued)

OTHER PUBLICATIONS

German Office Action, Application No. 102019203251.6, 4 pages, dated Dec. 19, 2019.

(Continued)

*Primary Examiner* — Richard M Camby
(74) *Attorney, Agent, or Firm* — Slayden Grubert Beard PLLC

(57) ABSTRACT

The invention relates to a method for secure signal manipulation for testing integrated safety functionalities and to a system for carrying out the method. In the first step 100, an input signal of a software-based motor vehicle component rated as having a hazard level of ASIL A to ASIL D according to ISO standard 26262 is selected; in the second step 200, a test signal is determined by modifying the selected input signal; in the third step 300, an external signal manipulation unit is provided for verification and validation tests of the safety function in a QM context 2 according to ISO standard 26262; in the fourth step 400, the connection between the motor vehicle component and the external signal manipulation unit is established; in the fifth step 500, a safety function of the motor vehicle component is tested; in the sixth step 600, the test result is checked by means of a third test signal W3; in the seventh step 700, the test signals are, if necessary, modified for as long as is required until the relevant output signal corresponds to the target output signal; in the eighth step 800, the tested safety (Continued)

function is enabled. The method according to the invention makes possible efficient, complex, flexible and cost-effective signal manipulation in software-based vehicle components while also improving the functional safety thereof.

5 Claims, 2 Drawing Sheets

(58) Field of Classification Search
CPC ........... B60W 2050/041; B60W 50/04; B60W 50/02; H04L 12/40; H04L 2012/40273; G06F 11/263; G06F 11/0796; G06F 11/0739; G06F 11/261; G06F 11/2273
See application file for complete search history.

(56) References Cited

U.S. PATENT DOCUMENTS

| | | | |
|---|---|---|---|
| 9,297,855 B1* | 3/2016 | Jindal | ............... G06F 30/30 |
| 9,566,966 B2 | 2/2017 | Erdem et al. | |
| 2015/0019779 A1* | 1/2015 | Hirade | ............... G06F 13/24 |
| | | | 710/260 |
| 2015/0025748 A1* | 1/2015 | Hagnander | ............ B60K 28/06 |
| | | | 701/45 |
| 2017/0282972 A1 | 10/2017 | Moretti | |
| 2018/0144640 A1 | 5/2018 | Price et al. | |
| 2018/0329408 A1 | 11/2018 | Schultalbers et al. | |
| 2019/0272210 A1* | 9/2019 | Colombo | ............ G06F 11/0751 |
| 2020/0117565 A1* | 4/2020 | Ponnuvel | ............... G06F 1/3243 |

FOREIGN PATENT DOCUMENTS

| | | | |
|---|---|---|---|
| DE | 102017202347 A1 | 8/2018 | ........... B60R 16/023 |
| EP | 2759939 B1 | 6/2016 | ........... G06F 11/263 |
| IN | 3210/CHE/2014 | 6/2014 | |
| WO | 2005/045538 A1 | 5/2005 | ............. G05B 15/02 |
| WO | 2015/058119 A2 | 4/2015 | ................ B60T 8/88 |
| WO | 2018/198783 A1 | 11/2018 | .......... G01M 17/007 |

OTHER PUBLICATIONS

Jeon, Seo-Hyun et al., "Automotive Hardware Development According to ISO 26262," 13th International Conference on Advanced Communication Technology (ICACT2011), Seoul, pp. 588-592, 2011.

* cited by examiner

METHOD AND SYSTEM FOR SECURE SIGNAL MANIPULATION FOR TESTING INTEGRATED SAFETY FUNCTIONALITIES

CROSS-REFERENCE TO RELATED APPLICATIONS

This application claims priority to German Patent Application DE 10 2019 203 251.6, filed on Mar. 11, 2019 with the German Patent and Trademark Office. The contents of the aforesaid Patent Application are incorporated herein for all purposes.

TECHNICAL FIELD

The invention relates to a method for secure signal manipulation for testing integrated safety functionalities. The invention also relates to a system for secure signal manipulation for testing integrated safety functionalities.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Nearly all closed-loop and open-loop control tasks arising during operation of modern motor vehicles are performed using software-based, mostly electronic vehicle components or systems. As an example of the range of tasks performed by these components or systems during typical driving operation, at one end of the spectrum, there is the automatic dimming of headlights when traffic is approaching in the opposite direction and, at the other end of the spectrum, there is highly automated driving by means of a plurality of assistance systems, the monitoring of the vehicle surroundings being conducted under the complete control of these systems.

The software in modern motor vehicles therefore not only contributes to increased driver comfort, but also makes a significant contribution to accident prevention and passenger safety.

The latest developments towards autonomous or driverless driving have not only been accompanied by an increase in the use of software-based components in motor vehicles, but also an increase in the proportion of total vehicle costs of these systems. In fact, this development is in particular also defined by the qualitative development of existing software solutions, which is solely the result of the quantity and complexity of the problems that have to be taken into consideration with regard to semi-autonomous driving. Whether and to what extent these problems can be mastered in real vehicle operation therefore substantially depends on flawless cooperation between the respective assistance systems involved and thus on the flawlessness of each individual piece of component software used.

Security aspects, in particular, must also be considered, such that unauthorized access to the vehicle components used is prevented as reliably as possible.

Therefore, in modern motor vehicles, not only must every individual software-based component meet stringent requirements in terms of their own functional safety, so too must all such components taken together as an entire system. This must be demonstrated by means of suitable functional tests of all vehicle components. A known method for doing this is to apply suitable test signals to each piece of software to be tested and to analyze the system response. Tests of this kind are laborious and often cost-intensive due to the large number of system components of this kind in a modern motor vehicle.

The performance of such tests for verifying and validating the safety functions is regulated, for example, in ISO standard 26262 for safety-related electrical or electronic systems in motor vehicles according to a multi-level concept (level 1—system level, level 2—hardware level, level 3—software level). Subsequently, every malfunction must be analyzed with regard to severity, exposure and controllability in driving operation and assigned to one of a total of five corresponding hazard levels—QM, ASIL A, ASIL B, ASIL C, ASIL D—whereby ASIL D is the highest and QM is the lowest hazard level (ASIL=Automotive Safety Integrity Level, QM=Quality Management). Based on this, arrangements must then be made for the corrective measures specified in the standard.

The verification and validation of safety functions in test concepts on this basis uses special software with integrated signal manipulation (fault injection software). This fault injection software provokes a malfunction on level 1 of a system component to be tested in order to prove that the safety function of level 2 detects said malfunction and takes appropriate action.

Usually, the release of a system component is carried out using this special software, and thus for a software version that does not correspond to the series software version that is to receive a corresponding release recommendation.

The two above-mentioned software versions differ at least in terms of the additional functionality introduced for signal manipulation. Since this additional software functionality is not monitored separately, this poses a potential safety risk.

According to the prior art, fault injection software is usually integrated in series software, and therefore verification and validation of the relevant safety function are also possible in the series product at any time. In order to prevent unintentional triggering of the manipulation function during driving operation, suitable protective measures must therefore be provided. These protective measures are required, regardless of the type of test method used in verification and validation of the safety function of a system component, and thus not only in tests according to ISO standard 26262 with the known multilevel concept, but also in alternative tests developed by means of qualified tools, such as SCADE with a certified compiler.

However, these protective measures cannot ensure that no inadmissible manipulations are carried out during the cyclical execution of the integrated fault injection software. Instead, additional precautions must be put in place.

The fault injection function implemented in series software also requires additional resources in the form of memory space and runtime, which must be provided.

Furthermore, appropriate intervention must be provided for every signal that has to be manipulated for the various tests using the fault injection function implemented in the series software.

If tests involving more complex signal curves are to be carried out using the fault injection function integrated in the series software, the corresponding signal generators, for example for ramp-shaped curves, sinus functions or triangle functions, as well as calculations of dependent variables, must be stored in the target system. Furthermore, a corresponding number of application parameters that have to be managed, tested and documented must be provided for such tests.

Unintentional activation of the fault injection function must always be reliably prevented in driving operation during proper use of a software-based individual component that uses fault injection software. For this purpose, suitable basic parameterization and documentation must be provided.

Occasionally, it may also be necessary, for the purpose of reducing the risk of maloperation and/or for the purpose of protecting intellectual property, to conceal the data collected by the fault injection software from the user of a software-based individual component. In this case, too, the measures to be taken for locking the data are subject to the provisions of ISO standard 26262 and must be taken into consideration in each individual case in order to prevent endangering the functional safety of the relevant component.

Various methods for checking safety functions of a vehicle based on control signals are known from the prior art.

An example of this is given in DE 10 2012 215 343 A1. According to this document, diagnostic tests are used to check at repeated time intervals whether there is a fault in a motor vehicle system that could impair execution of a safety function. Using a communication system and a control unit, a reliability value for detecting a fault prior to impairment of the safety function is determined from the test data.

DE 10 2017 202 347 A1 discloses a method for testing functional safety during operation of a vehicle based on data exchange between two control devices and based on a modification of control signals by means of a third control device. Signal changes are tested at system level between the control devices.

A method for manipulating access to a memory by means of a memory manipulation program component that is carried out in a vehicle via a control device program of a control device unit is described in EP 2 759 939 B1.

SUMMARY

An object of the present invention is to provide a method for secure signal manipulation for testing integrated safety functionalities, which method is suitable for overcoming the disadvantages of the prior art and in particular for making possible efficient, complex, flexible and cost-effective signal manipulation in software-based vehicle components while also improving the functional safety thereof.

The object is solved by the subject matter of the independent claims. Embodiments of the invention are the discussed in the dependent claims and the following description.

In one aspect, a method for secure signal manipulation for testing integrated safety functionalities of a software-based motor vehicle component in a motor vehicle is provided. The method comprises the steps of:
  selecting at least one first input signal applied to an input of a software-based motor vehicle component rated as having a hazard level of ASIL A to ASIL D according to ISO standard 26262 for a safety analysis of a safety function of the motor vehicle component, the first input signal applied to the input corresponding to a first control signal generated by the motor vehicle;
  determining at least one first test signal by modifying the selected at least one first input signal;
  providing an external signal manipulation unit for verification and validation tests of the safety function of the motor vehicle component using the determined at least one first test signal in a QM context;
  interrupting the connection between the motor vehicle component and the motor vehicle and establishing a connection to the signal manipulation unit, such that the first test signal is applied to the input of the motor vehicle component instead of the first input signal;
  carrying out the verification and validation tests of the safety function of the motor vehicle component using the at least one first test signal and using standardized XCP services, the relevant output signal applied to an output of the motor vehicle component being detected by the signal manipulation unit;
  checking the verification and validation tests carried out using the signal manipulation unit outside the motor vehicle component using a third test signal provided by the signal manipulation unit and a target output signal of the motor vehicle component;
  adjusting the at least one first and third test signal using another external signal manipulation of the respectively selected signal and repeating the preceding steps of carrying out the verification and validation tests and checking the verification and validation tests using the manipulated test signals, if necessary, for as long as is required until the relevant output signal corresponds to the target output signal; and
  enabling the tested safety function by interrupting the connection between the signal manipulation unit and the motor vehicle component and re-establishing the connection between the motor vehicle component and the motor vehicle via the at least one input and the output of the motor vehicle component.

The details of one or more embodiments are set forth in the accompanying drawings and the description below. Other features will be apparent from the description, drawings, and from the claims.

DESCRIPTION

Figure 1:
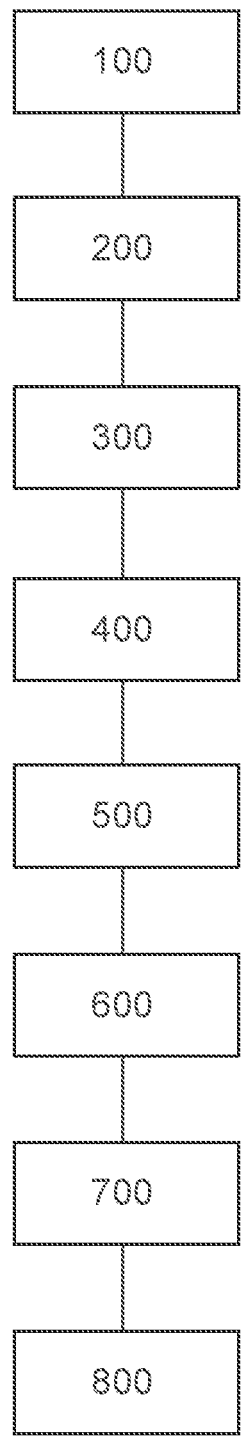
FIG. 1 is a schematic representation of the method steps of a method for secure signal manipulation for testing integrated safety functionalities.

Specific embodiments of the invention are here described in detail, below. In the following description of embodiments of the invention, the specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

A first, exemplary aspect of the present invention relates to a method for secure signal manipulation for testing integrated safety functionalities of a software-based motor vehicle component in a motor vehicle. Said method may comprise the method steps described in the following.

In a first exemplary step, a software-based component of a motor vehicle may be selected for a safety analysis of a safety function provided in said component. Safety functions of motor vehicle components are usually standardized. ISO standard 26262 distinguishes between four hazard levels—ASIL A to ASIL D—in electrical, electronic and programmable motor vehicle components, for which corresponding safety functions must be provided for controlling them. A safety function monitors a control signal generated by the motor vehicle that is applied as an input signal to an input of the software-based motor vehicle component. Therefore, for a test of the safety functionalities integrated in a motor vehicle component, all relevant input and output signals are firstly identified.

In a second exemplary step, a suitable test signal may then be determined. For this purpose, the previously identified input signal is modified in such a way that it can provoke a malfunction of the motor vehicle component. In this way, all signals determined for signal manipulation prior to a safety analysis are processed.

In a third exemplary step, an external signal manipulation unit may be provided for verification and validation tests of the safety function of the software-based motor vehicle component. Said unit is used to generate at least one previously determined test signal and to provide said test signal for injection into the motor vehicle component to be tested. By operating the external signal manipulation unit for checking the safety function of the selected motor vehicle component in a manner independent of the motor vehicle and without the involvement of a test routine stored in the motor vehicle component, the integrated safety functionalities can be checked in a QM context as per ISO standard 26262 by means of secure signal manipulation. In other words, the signal manipulation according to the present aspect uses no internal mechanisms of the motor vehicle component, but rather takes place externally via a suitable tool (for example a PC tool with software).

When using standardized XCP services for manipulating signals by means of the external signal manipulation unit, no special safeguard mechanisms are provided in the protocol, since these services are primarily intended for developing function prototypes.

In a fourth exemplary step, the connection between the software-based motor vehicle component and the motor vehicle may be interrupted and a connection is established to the external signal manipulation unit. For this purpose, instead of the control signal generated by the motor vehicle and initially applied as the input signal, the test signal generated by the external signal manipulation unit is injected into the input of the software-based motor vehicle component.

In a fifth exemplary step, the verification and validation tests of the safety function may be performed at the input or inputs of the software-based motor vehicle component. For this purpose, the motor vehicle component to be tested is operated with the at least one test signal applied to the input and the corresponding output signal generated by the motor vehicle component and applied to the output is detected by the external signal manipulation unit. If the resulting output signal indicates a safe state of the motor vehicle component tested, this is proof that the safety functionality integrated in the motor vehicle component is functioning properly.

Due to the fact that the calculations required for the signal manipulation are carried out in the external signal manipulation unit—and thus outside the DUT (device under test)—said calculations can be much more complex and are more flexible in design.

Because the signal manipulation according to the present exemplary aspect does not take place in the series product, it cannot trigger a malfunction in the motor vehicle; the software to be tested by signal manipulation corresponds to the series software. A special software version for test purposes is therefore not required.

In a sixth exemplary step, the verification and validation tests carried out by means of the external signal manipulation unit outside the software-based motor vehicle component may be checked. For this purpose, the output signal of the motor vehicle component is simulated by means of a third test signal provided by the external signal manipulation unit and obtained by modifying an output signal generated by the motor vehicle component.

Since the test procedure generally takes place subsequent to the development of the functions implemented in a motor vehicle component, adjustments often have to be made to test initiation and evaluation during the creation and implementation of the verification and validation tests. When the stimulation is carried out externally, these adjustments do not require renewed intervention in the function to be tested. Therefore, the function does not have to be released a second time.

In a seventh exemplary step, the test signal obtained according to the second method step may be adjusted in order to provide for an output behavior of the motor vehicle component that may not yet correspond with the specifications. For this purpose, the at least one first and the third test signal of the external signal manipulation unit are modified in view of the relevant target output behavior. The verification and validation tests are then carried out once more using the modified test signals. These steps may, if necessary, be repeated as many times as is required until the relevant output signal of the motor vehicle component corresponds to the relevant specified target output signal.

Finally, in an eighth exemplary step, the tested safety function of the tested motor vehicle component may be enabled. For this purpose, the electrical connection between the external signal manipulation unit and the motor vehicle component is interrupted and the original connection to the motor vehicle is re-established via the input or output of the component.

The before mentioned exemplary method is therefore suitable for use in all control device projects, regardless of the functional safety classification.

Another exemplary aspect of the present invention relates to a system for secure signal manipulation for testing integrating safety functionalities according to the before mentioned method The system comprises a software-based motor vehicle component of hazard level ASIL A to ASIL D according to ISO standard 26262 in a motor vehicle having at least one input and one output.

Additionally, the system according to the present aspect comprises an external signal manipulation unit for verification and validation tests of the safety function of the software-based motor vehicle component in a QM context according to ISO standard 26262. The external signal manipulation unit makes it possible to generate test signals based on control signals of the motor vehicle, which are operationally applied to an input or the inputs of the motor vehicle component, and to provide an output test signal of the motor vehicle component. Existing software solutions may be used for this purpose.

For this purpose, the external signal manipulation unit comprises at least one first and one second status change switch that each make it possible to alternately toggle between one first and one second switching position each.

The at least one first status change switch is configured, in the first position thereof, to establish a connection between the input of the software-based motor vehicle component and the external signal manipulation unit, whereas the second status change switch is intended, in the first position thereof, to establish a connection between the output of the motor vehicle component and the external signal manipulation unit. The relevant connection comprises a logical link in the software of the motor vehicle component.

The at least one first status change switch is configured, in the second position thereof, to establish a connection between at least one input of the motor vehicle component and the motor vehicle. The second status change switch is intended, in the second position thereof, to establish a connection between the output of the motor vehicle component and the motor vehicle.

By virtue of the at least one first status change switch, the external signal manipulation unit is suitable for providing the generated test signal(s) to the input or inputs of the software-based motor vehicle component. The external signal manipulation unit also makes it possible to provide generated test signal(s) to the second status change switch or to the output of the motor vehicle component.

The external signal manipulation unit additionally comprises a memory and a controller. The memory makes it possible to provide the data gathered during the test of the safety functionalities integrated in the motor vehicle component for evaluation by the controller. The external signal manipulation unit therefore comprises all required components for secure signal manipulation for testing integrated safety functionalities of a software-based motor vehicle component outside same and independently of the motor vehicle.

Other embodiments result from the remaining features specified in the dependent claims.

In an embodiment of the method according to the first aspect, the verification and validation tests in the fifth method step are carried out using XCP STIM services by means of time-synchronous manipulation via the vehicle bus or an adapter to a debug interface (POD, plug-on device).

The use of XCP STIM services makes possible the time-synchronous manipulation via the vehicle bus or an additional piece of hardware (plug-on device, POD). By virtue of the direct access to the controller via a POD, the short cycle times of closed-loop control functions may also be achieved. In the case of a multi-processor architecture, each processor (CPU) may also be accessed individually.

In a multi-processor architecture, synchronous stimulation via XCP automatically occurs if synchronous measurement was also implemented. Synchronous measurement can be used as a basic prerequisite for a safety-related application involving a plurality of processors.

In another embodiment of the method according to the first aspect, the time-synchronous manipulation is also used for rapid prototyping of a safety function of the software-based motor vehicle component.

In an embodiment of the system, the external signal manipulation unit comprises a computer having signal manipulation software.

The various embodiments mentioned in this application may be combined with one another, unless designed otherwise in individual cases.

Reference will now be made to the drawings in which the various elements of embodiments will be given numerical designations and in which further embodiments will be discussed.

Specific references to components, process steps, and other elements are not intended to be limiting. Further, it is understood that like parts bear the same or similar reference numerals when referring to alternate figures. It is further noted that the figures are schematic and provided for guidance to the skilled reader and are not necessarily drawn to scale. Rather, the various drawing scales, aspect ratios, and numbers of components shown in the figures may be purposely distorted to make certain features or relationships easier to understand.

FIG. 1 is a schematic representation of the individual steps of an exemplary embodiment of a method for secure signal manipulation for testing integrated safety functionalities.

In a first method step 100, an input signal V' at a first input 121 of a software-based motor vehicle component 12, which is rated as having a hazard level ASIL D according to ISO standard 26262, is selected for a safety analysis of a safety function of the motor vehicle component 12. The first input signal V' corresponds to a first control signal V generated by the motor vehicle 11.

In a second method step 200, a first test signal W1 is determined. For this purpose, the first input signal V' is modified such that it can trigger a malfunction in the motor vehicle component 12.

In a third method step 300, an external signal manipulation unit 21 is provided, said unit being suitable for providing the first test signal W1 determined in the second method step for the purpose of a verification and validation test of the safety function of the motor vehicle component 12 in a QM context 2 according to ISO standard 26262.

In order to inject said first test signal W1 into the input 121 of the motor vehicle component 12 instead of the first input signal V' in a fourth method step 400, the connection between the motor vehicle component 12 and the motor vehicle 11 is interrupted and, instead, a corresponding connection is established to the signal manipulation unit 21.

In a fifth method step 500, a verification and validation test of the safety function of the motor vehicle component 12 is performed by means of the first test signal W1 using standardized XCP services. At the same time, a resulting output signal F' at an output 122 of the motor vehicle component 12 is detected by means of the external signal manipulation unit 21.

Subsequently, in a sixth method step 600, the external signal manipulation unit 21 outside the motor vehicle component 12 is used to check whether and/or to what extent the result obtained during the verification and validation test corresponds with the specifications. For this purpose, the output signal of the motor vehicle component is simulated by means of a third test signal W3 of the external signal manipulation unit 21.

In the event that a deviation in the output behavior from the relevant target output behavior is thereby detected, in a seventh method step 700, the first and the third test signal W1, W3 are modified by means of the external signal manipulation unit 21. The fifth and sixth method steps 500, 600 are repeated using these modified test signals W1, W3. The comparison of the output signals F' occurring at the output of the motor vehicle component 12 with the target output signals F in turn provides information on the effectiveness of the safety functionality integrated in the motor vehicle component 12. Said seventh method step 700 is repeated using a relevant modified test signal W1, W3 for as long as is required until the effectiveness of the safety functionality has been established.

If this is the case, in an eighth method step 800, the tested safety function is enabled. For this purpose, the electrical connection between the signal manipulation unit 21 and the motor vehicle component 12 is interrupted and the connection between the motor vehicle 11 and the motor vehicle component 12 is re-established via the respective input 121 and output 122 thereof.

Figure 2:
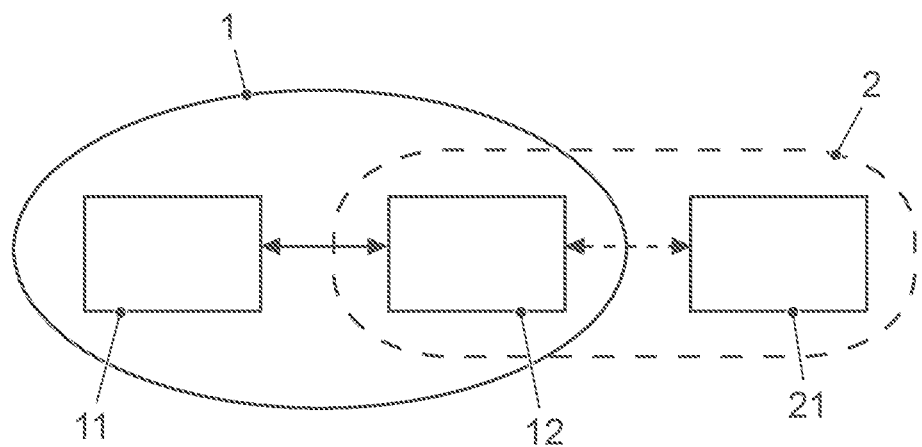
FIG. 2 shows a system for secure signal manipulation for testing integrated safety functionalities of the method from FIG. 1.

FIG. 2 shows an embodiment of a system for applying the method for secure signal manipulation for testing integrated safety functionalities as discussed. Said system is formed of a motor vehicle 11, a motor vehicle component 12 to be tested and an external signal manipulation unit 21. According to the specifications of ISO standard 26262, an ASIL D context 1 should be assumed for a risk assessment of the motor vehicle 11 having the motor vehicle component 12, whereas for the test environment—comprising the motor vehicle component 12 and the external signal manipulation unit 21—a QM context 2 should be assumed.

Figure 3:
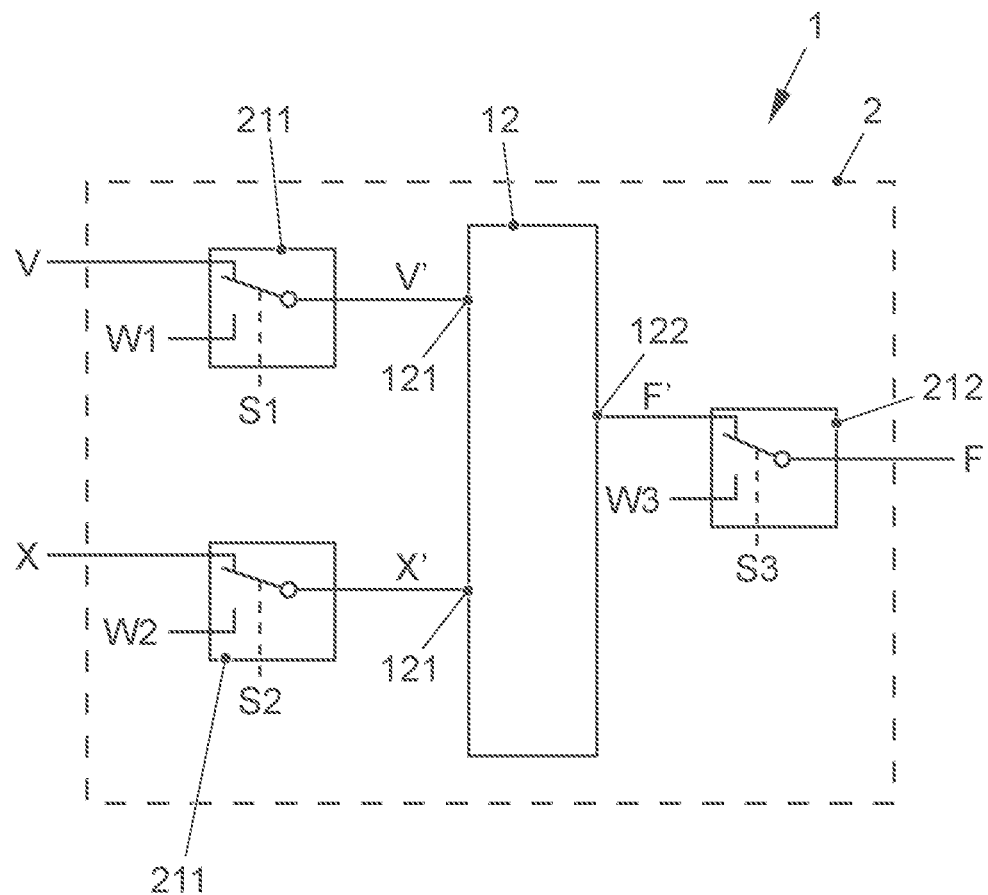
FIG. 3 shows the interaction between individual components of an external signal manipulation unit for secure signal manipulation for testing integrated safety functionalities of a motor vehicle component in the QM context in a specific embodiment of the system from FIG. 2.

FIG. 3 shows a test environment according to the present aspect in the QM context 2, comprising a motor vehicle component 12 to be tested. The QM context 2 in this case forms a protected region having its own memory, which is provided in an external signal manipulation unit 21. Said unit is represented by two first status change switches 211 for injecting the first and second test signal W1, W2 into the motor vehicle component 12 via the inputs 121, and a second status change switch 212 for providing a third test signal W3 as the output signal of the motor vehicle component 12.

Each status change switch 211, 212 is designed for alternately toggling between a first and a second position by means of one status control signal S1, S2, S3 each.

The first two status change switches 211 are in a respective second position and, in this position, inject a first and a second control signal V, X of the motor vehicle 11 into the two inputs 121 of the motor vehicle component 12 as the first and second input signal V', X'. The first and second test signal W1, W2 provided by the external signal manipulation unit 21 are held at the two first status change switches 211, respectively, ready for alternative injection into the two first inputs 121 of the motor vehicle component 12. The second status change switch 212 is also in the second position thereof and, in this position, connects the output 122 of the motor vehicle component 12 to the motor vehicle 11. The motor vehicle component 12 is thus shown to be in the regular operating state thereof in the motor vehicle 11.

For the secure signal manipulation for testing the safety functionalities integrated in the motor vehicle component 12, each status change switch 211, 212 can thus be brought into the first position thereof by means of one status control signal S1, S2, S3 each, such that each test signal W1, W2, W3 provided by the external signal manipulation unit 21 can be fed to one of the two inputs 121 or the output 122 of the motor vehicle component 12 in the QM context 2.

This test environment also makes it possible to provide safeguard measures. For example, the signal enabling by means of the status control signals S1, S2, S3 can be limited in time by means of a timer. Even the signal to be manipulated requires explicit enabling. Other safeguard measures result from considering the memory context and from the fact that one distinct XCP event is defined for each context. In a similar way to the safety architecture of the motor vehicle component, cross-influences on regions of the software not tested in a particular test step are prevented. Finally, security mechanisms such as signatures may additionally be used.

LIST OF REFERENCE NUMBERS

1 ASIL D context (ISO standard 26262)
11 Motor vehicle
12 Motor vehicle component/DUT (device under test)/function
121 Input
122 Output
2 QM context (ISO standard 26262)
21 External signal manipulation unit
211 First status change switch
212 Second status change switch
100 First method step
200 Second method step
300 Third method step
400 Fourth method step
500 Fifth method step
600 Sixth method step
700 Seventh method step
800 Eighth method step
F Target output signal
F' Output signal
S1 First status control signal
S2 Second status control signal
S3 Third status control signal
V First control signal
V' First input signal
W1 First test signal
W2 Second test signal
W3 Third test signal
X Second control signal
X' Second input signal The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measures cannot be used to advantage. Any reference signs in the claims should not be construed as limiting the scope.

What is claimed is:
1. A method for secure signal manipulation for testing integrated safety functionalities of a software-based motor vehicle component in a motor vehicle with the steps of:
   selecting at least one first input signal applied to an input of a software-based motor vehicle component rated as having a hazard level of ASIL A to ASIL D according to ISO standard 26262 for a safety analysis of a safety function of the motor vehicle component, the first input signal applied to the input corresponding to a first control signal generated by the motor vehicle;
   determining at least one first test signal by modifying the selected at least one first input signal;
   providing an external signal manipulation unit for verification and validation tests of the safety function of the motor vehicle component using the determined at least one first test signal in a QM context;

interrupting the connection between the motor vehicle component and the motor vehicle and establishing a connection to the signal manipulation unit, such that the first test signal is applied to the input of the motor vehicle component instead of the first input signal;

carrying out the verification and validation tests of the safety function of the motor vehicle component using the at least one first test signal and using standardized XCP services, the relevant output signal applied to an output of the motor vehicle component being detected by the signal manipulation unit;

checking the verification and validation tests carried out using the signal manipulation unit outside the motor vehicle component using a third test signal provided by the signal manipulation unit and a target output signal of the motor vehicle component;

adjusting the at least one first and third test signal using another external signal manipulation of the respectively selected signal and repeating the preceding steps of carrying out the verification and validation tests and checking the verification and validation tests using the manipulated test signals, if necessary for as long as is required until the relevant output signal corresponds to the target output signal; and enabling the tested safety function by interrupting the connection between the signal manipulation unit and the motor vehicle component and re-establishing the connection between the motor vehicle component and the motor vehicle via the at least one input and the output of the motor vehicle component.

2. The method of claim 1, wherein the verification and validation tests are carried out using XCP STIM services on the basis of time-synchronous manipulation via the vehicle bus or an adapter to a debug interface (POD, plug-on device).

3. The method of claim 2, wherein the time-synchronous manipulation is used for rapid prototyping of a safety function of the motor vehicle component.

4. A system for carrying out the method of claim 1, comprising, in a motor vehicle, a software-based motor vehicle component rated as having a hazard level of ASIL A to ASIL D according to ISO standard 26262 with at least one input and one output;

wherein the system additionally comprises:

an external signal manipulation unit for verification and validation tests of the safety function of the motor vehicle component in a QM context according to ISO standard 26262 by manipulation of a first input signal that is applied to the input and that corresponds to a first control signal generated by the motor vehicle; the signal manipulation unit comprising at least one first and one second status change switch for controlling an alternating toggling between a first and a second position using one status control signal each; the at least one first status control switch being configured, in the first position thereof, to establish an electrical connection between the input of the motor vehicle component and the signal manipulation unit and the second status change switch being configured, in the first position thereof, to establish an electrical connection between the output of the motor vehicle component and the signal manipulation unit, and the at least one first status change switch being configured, in the second position thereof, to establish an electrical connection between the at least one input of the motor vehicle component and the vehicle, and the second status change switch being configured, in the second position thereof, to establish an electrical connection between the output of the motor vehicle component and the motor vehicle; wherein the signal manipulation unit is configured to generate at least one test signal and to provide the at least one test signal to the at least one input of the motor vehicle component via the at least one first status change switch and to generate a further test signal and provide the further test signal to the at least one second status change switch; wherein the signal manipulation unit comprises a memory for storing and a controller for evaluating data collected during the verification and validation tests carried out by the signal manipulation unit outside the motor vehicle component.

5. The system of claim 4, wherein the external signal manipulation unit comprises a computer having signal manipulation software.

* * * * *